(12) United States Patent
Evangelides, Jr. et al.

(10) Patent No.: US 7,099,581 B2
(45) Date of Patent: Aug. 29, 2006

(54) OTDR ARRANGEMENT FOR DETECTING FAULTS IN AN OPTICAL TRANSMISSION SYSTEM ON A SPAN BY SPAN BASIS

(75) Inventors: Stephen G. Evangelides, Jr., Red Bank, NJ (US); Jay P. Morreale, Summit, NJ (US); Michael J. Neubelt, Little Silver, NJ (US)

(73) Assignee: Red Sky Subsea Ltd., Essex (GB)

( * ) Notice: Subject to any disclaimer, the term of this patent is extended or adjusted under 35 U.S.C. 154(b) by 0 days.

(21) Appl. No.: 10/618,259

(22) Filed: Jul. 11, 2003

(65) Prior Publication Data

US 2004/0037555 A1 Feb. 26, 2004

Related U.S. Application Data

(60) Provisional application No. 60/404,613, filed on Aug. 20, 2002.

(51) Int. Cl.
*H04B 10/00* (2006.01)

(52) U.S. Cl. .............................. 398/17; 398/10; 398/13; 398/18

(58) Field of Classification Search .................. 398/21, 398/173–181, 10–11, 13, 17–18, 20, 177
See application file for complete search history.

(56) References Cited

U.S. PATENT DOCUMENTS

| 5,296,957 A | 3/1994 | Takahashi et al. .......... 359/177 |
| 5,436,746 A | 7/1995 | Hirst .......................... 359/110 |
| 5,510,925 A | 4/1996 | Suzuki et al. ................ 359/177 |
| 5,778,117 A * | 7/1998 | Inoue et al. .................. 385/24 |
| 5,790,294 A | 8/1998 | Horiuchi et al. ............ 359/177 |
| 5,926,263 A | 7/1999 | Lynch et al. ................ 356/73.1 |
| 5,966,206 A | 10/1999 | Jander ....................... 356/73.1 |
| 5,995,254 A | 11/1999 | Koga et al. ................. 359/124 |
| 6,028,684 A | 2/2000 | Kidorf .......................... 359/110 |
| 6,075,628 A | 6/2000 | Fisher et al. ................ 359/110 |
| 6,301,036 B1 | 10/2001 | Spencer ....................... 359/179 |
| 6,381,011 B1 | 4/2002 | Nickelsberg et al. ...... 356/73.1 |
| 6,445,445 B1 | 9/2002 | Nakayama et al. ........ 356/73.1 |
| 6,807,370 B1 * | 10/2004 | Harasawa ..................... 398/13 |

* cited by examiner

*Primary Examiner*—Agustin Bello
(74) *Attorney, Agent, or Firm*—Mayer & Williams PC; Stuart H. Mayer, Esq.

(57) ABSTRACT

A method is provided for using optical time-domain reflectometry (OTDR) with a bi-directional optical transmission system that includes a plurality of terminals interconnected by first and second unidirectional optical transmission paths having at least one repeater therein. The method begins by transmitting a probe signal from a first terminal through the repeater over the first optical transmission path. A returned OTDR signal is received over the first optical transmission path in which status information concerning the first optical transmission path is embodied. The returned OTDR signal is transformed to a digitized electrical signal and the digitized electrical signal is transformed to an optical data signal. Finally, the optical data signal is transmitted over the second optical transmission path to the first terminal for extracting the status information embodied therein.

23 Claims, 3 Drawing Sheets

OTDR ARRANGEMENT FOR DETECTING FAULTS IN AN OPTICAL TRANSMISSION SYSTEM ON A SPAN BY SPAN BASIS

STATEMENT OF RELATED APPLICATION

This application claims the benefit of priority to U.S. Provisional Patent Application Ser. No. 60/404,613 filed Aug. 20, 2002, entitled "OTDR Arrangement For Detecting Faults In An Optical Transmission System On A Span By Span Basis."

FIELD OF THE INVENTION

The present invention relates generally to optical transmission systems, and more particularly to an optical time domain reflectometry (OTDR) arrangement that is used to detect faults in the optical transmission path of an optical transmission system.

BACKGROUND OF THE INVENTION

A typical long-range optical transmission system includes a pair of unidirectional optical fibers that support optical signals traveling in opposite directions. An optical signal is attenuated over long distances. Therefore, the optical fibers typically include multiple repeaters that are spaced apart from one another. The repeaters include optical amplifiers that amplify the incoming, attenuated optical signals. The repeaters also include an optical isolator that limits the propagation of the optical signal to a single direction.

In long-range optical transmission systems it is important to monitor the health of the system. For example, monitoring can be used to detect faults or breaks in the fiber optic cable such as attenuation in the optical fiber and splice loss, faulty repeaters or amplifiers or other problems with the system. Optical time domain reflectometry (OTDR) is one technique used to remotely detect faults in optical transmission systems. In OTDR, an optical pulse is launched into an optical fiber and backscattered signals returning to the launch end are monitored. In the event that there are discontinuities such as faults or splices in the fiber, the amount of backscattering generally changes and such change is detected in the monitored signals. Since backscatterring and reflection also occurs from elements such as couplers, the monitored OTDR signals are usually compared with a reference record, new peaks and other changes in the monitored signal level being indicative of changes in the fiber path, normally indicating a fault. The time between pulse launch and receipt of a backscattered signal is proportional to the distance along the fiber to the source of the backscattering, thus allowing the fault to be located. In a WDM system, one wavelength is usually assigned as the OTDR channel.

FIG. 1 shows a simplified block diagram of a wavelength division multiplexed (WDM) transmission system that employs a conventional OTDR. Each terminal 110 and 120 includes an OTDR unit 105 and 107, respectively. In operation, OTDR unit 105 generates an optical pulse that is launched into optical fiber 106. The optical pulse serves as the OTDR probe signal. Because optical isolators 115 located downstream from each optical amplifier 112 prevent the OTDR probe signal from being reflected and backscattered to the OTDR 105 on fiber 106, each repeater 114 includes a coupler arrangement providing an optical path for use by the OTDR. In particular, signals generated by reflection and scattering of the probe signal on fiber 106 between adjacent repeaters enter coupler 118 and are coupled onto the opposite-going fiber 108 via coupler 122. The OTDR signal then travels along with the data on optical fiber 108. OTDR 107 operates in a similar manner to generate OTRD signals that are reflected and scattered on fiber 108 so that they are returned to OTDR 107 along optical fiber 106.

FIG. 2 is a block diagram showing one example of a conventional OTDR unit that may serve as OTDR units 105 and 107. The OTDR unit includes a timing generator 211, a light source 212, a detector 214, an amplifier 215, an A/D converter 216, an adder 217 and controller 218. An optical pulse emitted by light source 212, which is driven by a signal from the timing generator 211, is launched into the transmission fiber 106. The reflected and backscattered OTDR signal is received by the detector 214 through a filter 213, amplified with a predetermined amplification factor by the amplifier 215 and introduced to the A/D converter 216. The A/D converter 216 samples the output of the amplifier 215 in a predetermined sampling cycle, and each of the sampled data is supplied to the adder 217. The adder 217 adds together the sampled data for a predetermined time and averages the data that is supplied to the controller 218. The controller 218 analyses the averaged data to monitor the transmission path for faults.

One problem with the conventional OTDR arrangement is that the OTDR signal returned to the OTDR unit in the terminal is typically attenuated by about 30 dB relative to the data signals. This low power level makes subsequent processing and analysis of the signal difficult.

Accordingly, it would be desirable to provide an OTDR arrangement for a multi-span, optically amplified transmission system that overcomes the aforementioned problem.

SUMMARY OF THE INVENTION

In accordance with the present invention, a method is provided for using optical time-domain reflectometry (OTDR) with a bi-directional optical transmission system that includes a plurality of terminals interconnected by first and second unidirectional optical transmission paths having at least one repeater therein. The method begins by transmitting a probe signal from a first terminal through the repeater over the first optical transmission path. A returned OTDR signal is received over the first optical transmission path in which status information concerning the first optical transmission path is embodied. The returned OTDR signal is transformed to a digitized electrical signal and the digitized electrical signal is transformed to an optical data signal. Finally, the optical data signal is transmitted over the second optical transmission path to the first terminal for extracting the status information embodied therein.

In accordance to one aspect of the invention, the steps of transforming the returned OTDR signal, transforming the digitized electrical signal, and transmitting the optical data signal over the second optical transmission path are performed in the repeater.

In accordance with another aspect of the invention, the repeater includes a rare-earth doped optical amplifier through which the probe signal is transmitted.

In accordance with another aspect of the invention, the step of receiving the returned OTDR signal is performed at an output of the rare-earth doped optical amplifier.

In accordance with another aspect of the invention, the step of transforming the returned OTDR signal to a digitized electrical signal is initiated upon receipt of the probe signal.

In accordance with another aspect of the invention, the optical data signal is processed in the first terminal to extract the status information.

In accordance with another aspect of the invention, the status information includes discontinuities in the first optical transmission path that give rise to optical attenuation.

In accordance with another aspect of the invention, the optical data signal is transmitted at a channel wavelength at which the optical transmission system operates.

In accordance with another aspect of the invention, a repeater is provided for a bi-directional optical transmission system that includes a plurality of terminals interconnected by first and second unidirectional optical transmission paths supporting a plurality of optical channels. The repeater includes an optical amplifier having an input for receiving over the first optical path an OTDR probe signal and an output through which the OTDR probe signal is directed. The repeater also includes an OTDR data acquisition arrangement receiving over the first optical transmission path at the output of the optical amplifier a returned OTDR signal in which status information concerning a span of the first optical transmission path is embodied. In response to the returned OTDR signal, the OTDR data acquisition arrangement transmits an optical signal at a channel wavelength along the second optical path in which the status information is embodied in digital form.

In accordance with another aspect of the invention, the OTDR data acquisition arrangement further includes an optical tap located in the first optical transmission path for receiving the returned OTDR signal and at least one detector coupled to the optical tap for converting the returned OTDR signal to a returned electrical signal. An A/D converter is coupled to the detector for converting the returned electrical signal to a digital electrical signal. An optical transmitter is coupled to the A/D converter for converting the digital electrical signal to the optical signal at the channel wavelength. A coupler is provided for coupling the optical signal at the channel wavelength onto the second optical transmission path.

DESCRIPTION OF THE INVENTION

Figure 1:
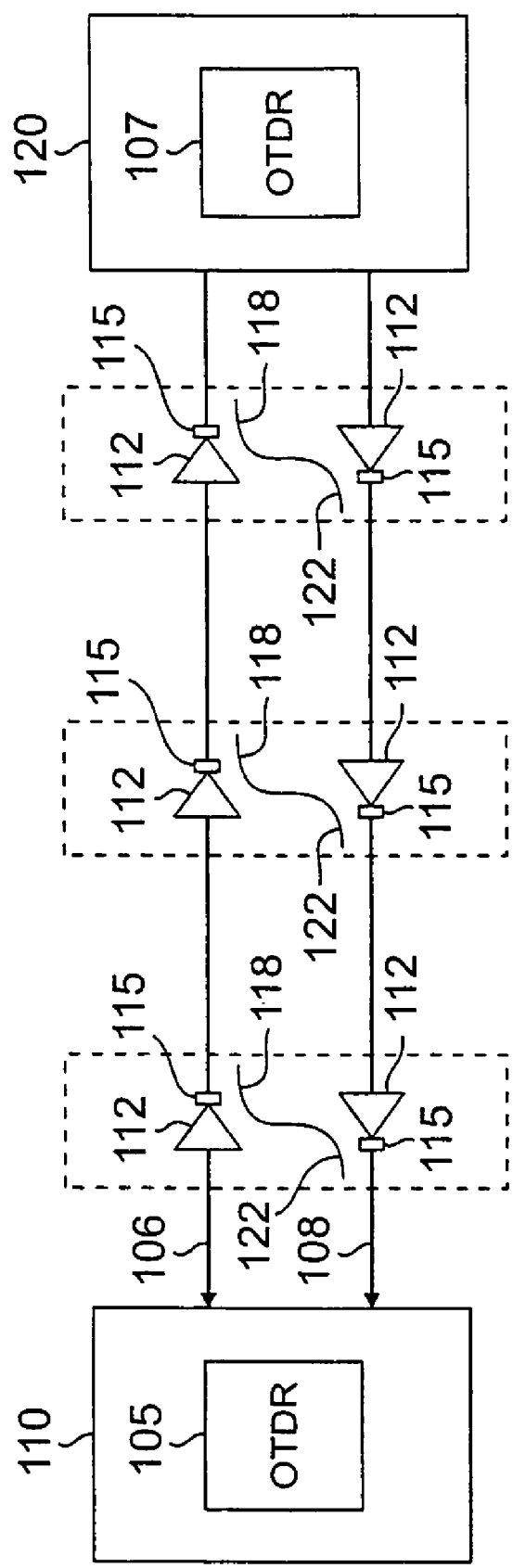
FIG. 1 shows a simplified block diagram of a wavelength division multiplexed (WDM) transmission system that employs a conventional OTDR.
Figure 2:
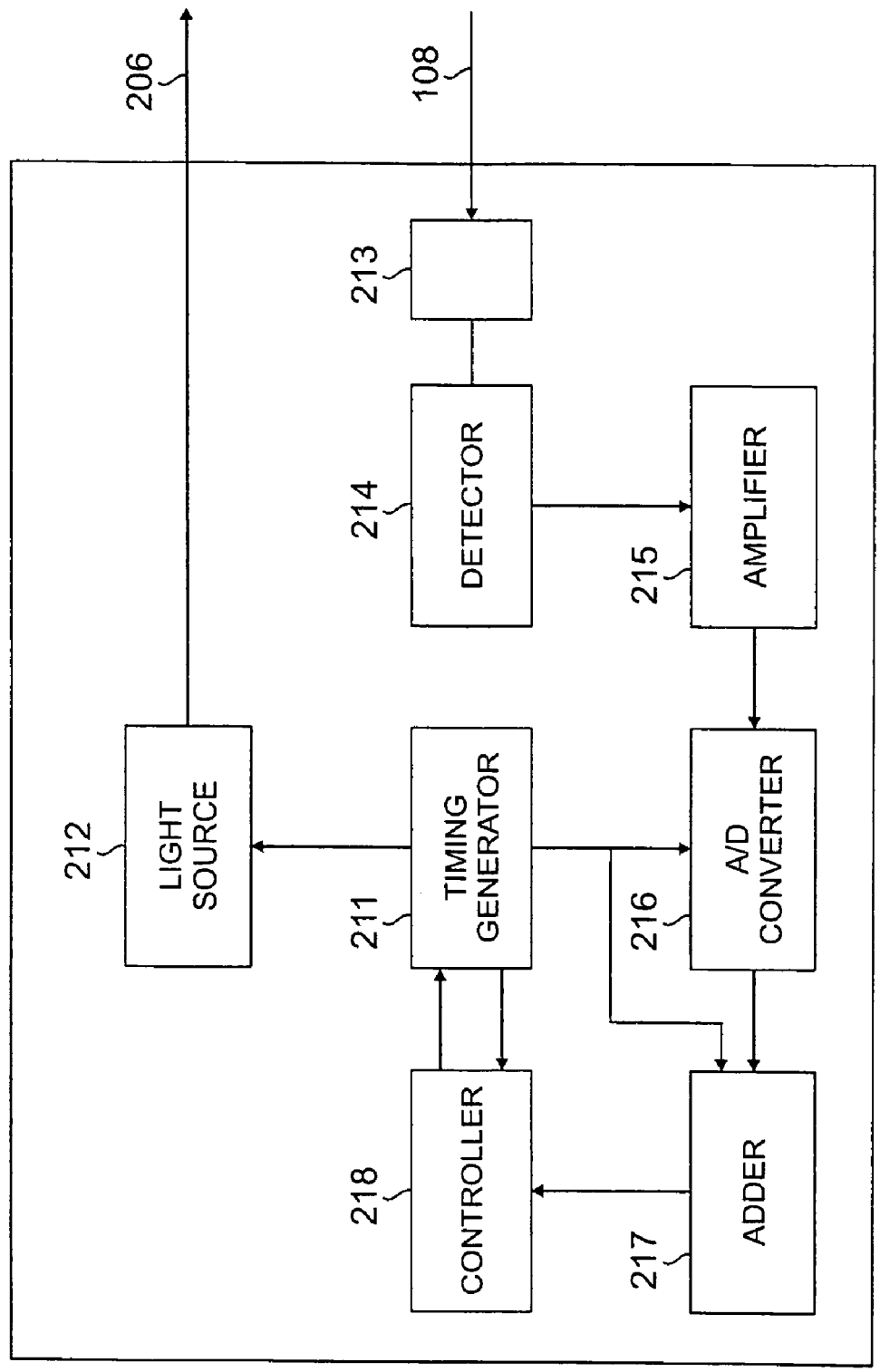
FIG. 2 is a block diagram showing one example of a conventional OTDR unit.

An OTDR arrangement is provided in which faults arising in a multi-span, optically amplified transmission system are examined by an OTDR probe signal, the data from which is acquired and processed on a span-by-span basis at each repeater site. The data is then returned for analysis over the opposite-going optical fiber on any desired channel to the OTDR unit located in the terminal from which the probe signal was launched. That is, the reflected and backscattered OTDR signal is converted to a digital signal that is transmitted along the opposite-going fiber just as any other data is transmitted. In contrast, in a conventional OTDR arrangement, the reflected and backscattered OTDR signal itself is returned to the OTDR unit located in the terminal, at which point acquisition, processing and analysis become more difficult because the OTDR signal has been even further attenuated. Viewed in light of the OTDR unit depicted in FIG. 2, the present invention transfers the functionality of the detector 214, amplifier 215, and A/D converter 216 from the OTDR units located in the terminals to the individual repeaters.

Figure 3:
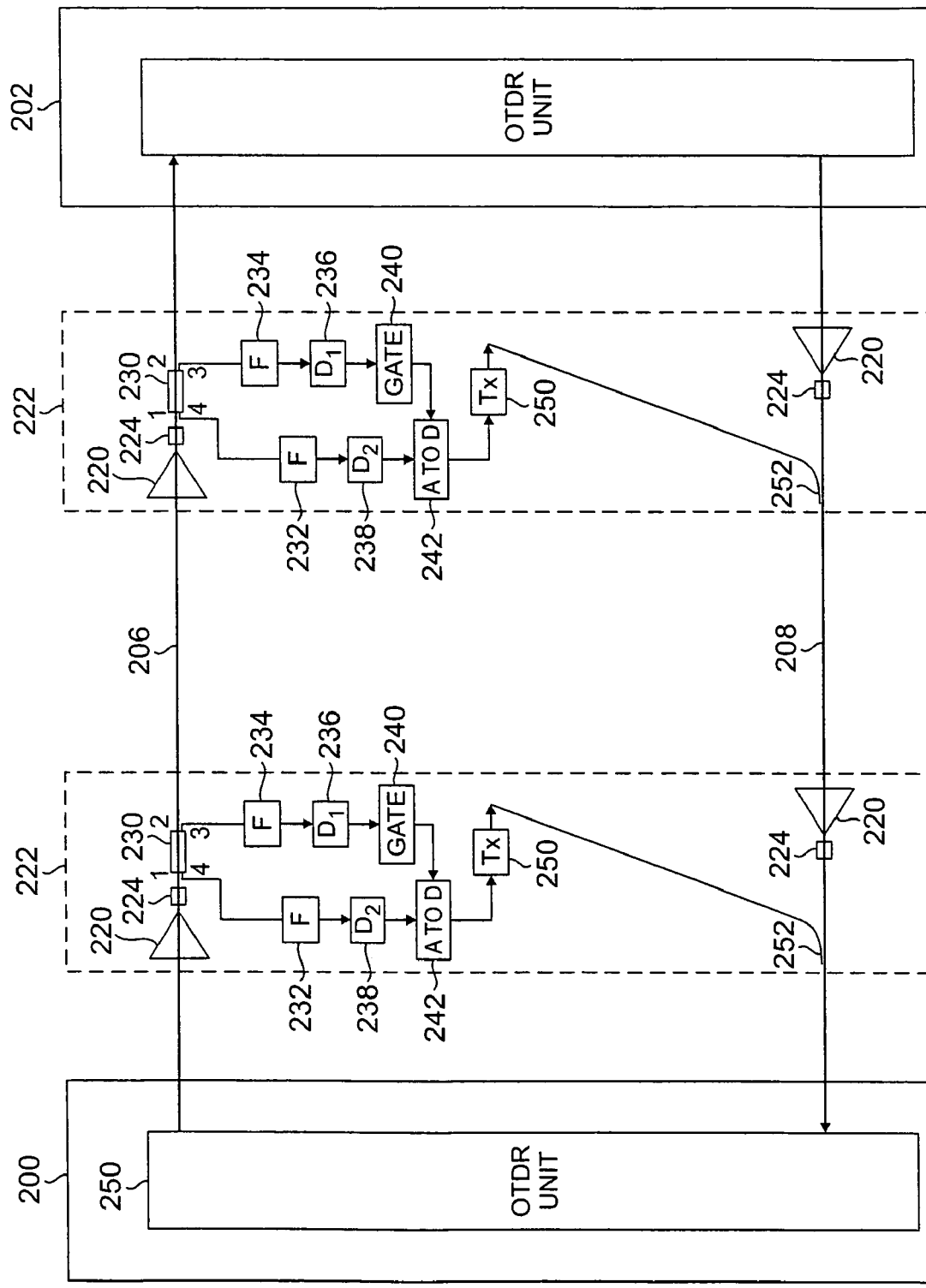
FIG. 3 shows a simplified block diagram of an exemplary wavelength division multiplexed (WDM) transmission system in accordance with the present invention.

FIG. 3 shows a simplified block diagram of an exemplary wavelength division multiplexed (WDM) transmission system in accordance with the present intention. The transmission system serves to transmit a plurality of optical channels over a pair of unidirectional optical fibers 206 and 208 between terminals 200 and 202, which are remotely located with respect to one another. Terminals 200 and 202 each include transmitting and receiving unit (not shown). The transmitting unit generally includes a series of encoders and digital transmitters connected to a wavelength division multiplexer. For each WDM channel, an encoder is connected to an optical source, which, in turn, is connected to the wavelength division multiplexer. Likewise, the receiving unit includes a series of decoders, digital receivers and a wavelength division demultiplexer.

Optical amplifiers 220 are located along the fibers 206 and 208 to amplify the optical signals as they travel along the transmission path. The optical amplifiers may be rare-earth doped optical amplifiers such as erbium doped fiber amplifiers that use erbium as the gain medium. As indicated in FIG. 3, a pair of rare-earth doped optical amplifiers supporting opposite-traveling signals is often housed in a single unit known as a repeater 222. While only two repeaters 222 are depicted in FIG. 3 for clarity of discussion, it should be understood by those skilled in the art that the present invention finds application in transmission paths of all lengths having many additional (or fewer) sets of such repeaters. Optical isolators 224 are located downstream from the optical amplifiers 220 to eliminate backwards propagating light and to eliminate multiple path interference.

In one embodiment of the invention the WDM transmission system is an undersea transmission system in which terminals 200 and 202 are located on shore and repeaters 222 are located undersea.

Each repeater 222 includes an OTDR data acquisition arrangement for obtaining the OTDR signal for the single transmission span located downstream from the respective repeater. The arrangement includes a bidirectional optical tap or coupler 230, filters 232 and 234 having a passband corresponding to the OTDR signal wavelength, optical-to-electrical detectors 236 and 238, and a gate 240 that activates an A/D converter 242. The optical tap 230, which is located in transmission path 206 at the output of the optical amplifier 220, has ports 1–4. Port 1 receives the probe signal from the output of the optical amplifier 220 and conveys it through the coupler to port 2 so that it continues along the transmission path 206. A small portion of the probe signal is tapped so that it exits on port 3 of the coupler 230. In addition, a portion of the backscattered and reflected signal enters port 2 of the coupler 230 and exits onto port 4. The portion of the probe signal output on port 3 of the coupler is dropped to filter 234, which removes all wavelengths but the wavelength of the probe signal, and the probe signal is received by detector 236. The probe signal opens the gate 240 to the A/D converter 242. Likewise, the backscattered and reflected OTDR signal is dropped from port 4 of the coupler to filter 232, which removes all wavelengths but the wavelength of the OTDR signal, which in turn is received by the detector. While not shown in FIG. 3, the repeaters 222 also include OTDR data acquisition arrangements to obtain the OTDR signals from optical fiber 208.

The OTDR probe signal is generated by the OTDR unit 250 located in terminal 200. The probe signal is a series of pulses that have a duration chosen to given the appropriate resolution that is needed for fault location. The duty cycle of the pulses is determined by the span length and is selected to avoid aliasing. OTDR unit 250 also includes a processor for analyzing the OTDR data obtained from the OTDR data acquisition arrangements.

In operation, when the forward-propagating probe signal is received by the gate 240, the gate opens so that the A/D converter 242 can begin the data acquisition process. Subsequently, when the reflected and backscattered OTDR signal has propagated on fiber 206 back toward the tap 230 it is converted to an electrical signal by detector 238 so that it can be digitized in time by the A/D converter 242. Data is accumulated over a time equal to the gate duration (i.e., the pulse roundtrip time along the span) so that it can be subsequently averaged over many successive pulses by the processor in the OTDR unit 250 in order to eliminate the effects of low signal levels. Finally, the OTDR data from the A/D converter 242 is converted to an optical signal by transmitter 250 and sent back to the OTDR unit 250 located in terminal 200 along optical fiber 208 on a service channel.

The invention claimed is:

1. A method of using optical time-domain reflectometry (OTDR) with a bi-directional optical transmission system that includes a plurality of terminals interconnected by first and second unidirectional optical transmission paths having at least one repeater therein, said method comprising the steps of:
   transmitting a probe signal from a first terminal through the repeater over the first optical transmission path;
   receiving over the first optical transmission path a returned OTDR signal in which status information concerning the first optical transmission path is embodied;
   transforming the returned OTDR signal to a digitized electrical signal;
   transforming the digitized electrical signal to an optical data signal; and
   transmitting the optical data signal over the second optical transmission path to the first terminal for extracting the status information embodied therein.

2. The method of claim 1 wherein the steps of transforming the returned OTDR signal, transforming the digitized electrical signal, and transmitting the optical data signal over the second optical transmission path are performed in said at least one repeater.

3. The method of claim 1 wherein said repeater includes a rare-earth doped optical amplifier through which the probe signal is transmitted.

4. The method of claim 3 wherein the step of receiving the returned OTDR signal is performed at an output of the rare-earth doped optical amplifier.

5. The method of claim 1 further comprising the steps of: receiving a portion of the probe signal; and
   initiating the step of transforming the returned OTDR signal to a digitized electrical signal upon receipt of the probe signal.

6. The method of claim 1 further comprising the step of processing, in the first terminal, the optical data signal to extract the status information.

7. The method of claim 6 wherein the status information includes discontinuities in the first optical transmission path that give rise to optical attenuation.

8. The method of claim 1 wherein the optical data signal is transmitted at a channel wavelength at which the optical transmission system operates.

9. In a bi-directional optical transmission system that includes a plurality of terminals interconnected by first and second unidirectional optical transmission paths supporting a plurality of optical channels and having at least one repeater therein, said repeater comprising:
   an optical amplifier having an input for receiving over the first optical path an OTDR probe signal and an output through which the OTDR probe signal is directed; and
   an OTDR data acquisition arrangement receiving over the first optical transmission path at the output of the optical amplifier a returned OTDR signal in which status information concerning a span of the first optical transmission path is embodied and, in response thereto, transmitting an optical signal at a channel wavelength along the second optical path in which said status information is embodied in digital form; and
   an optical tap located in the first optical transmission path for receiving the returned OTDR signal;
   at least one detector coupled to the optical tap for converting the returned OTDR signal to a returned electrical signal;
   an A/D converter coupled to the at least one detector for converting the returned electrical signal to a digital electrical signal;
   an optical transmitter coupled to the A/D converter for converting the digital electrical signal to said optical signal at the channel wavelength; and
   a coupler for coupling said optical signal at the channel wavelength onto the second optical transmission path.

10. In the bi-directional optical transmission system of claim 9 wherein the optical tap comprises at least one coupler for receiving a portion of the OTDR probe signal as well as the returned OTDR signal.

11. In the bi-directional optical transmission system of claim 10 wherein the at least one detector is arranged to also convert the OTDR probe signal to an electrical probe signal and a returned electrical signal.

12. In the bi-directional optical transmission system of claim 11 wherein said at least one coupler for receiving a portion of the OTDR probe signal and the returned OTDR signal is a hi-directional optical tap.

13. In the bi-directional optical transmission system of claim 11 wherein said at least one detector comprises first and second detectors for providing said electrical probe signal and said returned electrical signal, respectively.

14. In the hi-directional optical transmission system of claim 12 wherein said at least one detector comprises first and second detectors for providing said electrical probe signal and said returned electrical signal, respectively.

15. In the hi-directional optical transmission system of claim 14 wherein said OTDR data acquisition arrangement further comprises a gate coupled to the first detector to activate the A/D converter upon receipt of the electrical probe signal.

16. In a hi-directional optical transmission system that includes a plurality of terminals interconnected by first and second unidirectional optical transmission paths supporting a plurality of optical channels and having at least one repeater therein, said repeater comprising:
   means far transmitting a probe signal from a first terminal through the repeater over the first optical transmission path;
   means for receiving over the first optical transmission path a returned OTDR signal generated in response to the probe signal, said OTDR signal containing status information concerning the first optical transmission path;

means for transforming the returned OTDR signal to a digitized electrical signal;

means for transforming the digitized electrical signal to an optical data signal; and means for transmitting the optical data signal over the second optical transmission path to the first terminal for extracting the status information embodied therein.

17. In the bi-directional optical transmission system of claim 16 wherein said receiving means includes an optical tap located in the first optical transmission path for receiving the returned OTDR signal.

18. In the bi-directional optical transmission system of claim 17 wherein said transforming means comprises:

at least one detector coupled to the optical tap for converting the returned OTDR signal to a returned electrical signal, respectively;

an A/D converter coupled to the at least one detector for converting the returned electrical signal to a digital electrical signal;

an optical transmitter coupled to the A/D converter for converting the digital electrical signal to said optical signal at the channel wavelength; and a coupler for coupling said optical signal at the channel wavelength onto the second optical transmission path.

19. In the bi-directional optical transmission system of claim 18 wherein the optical tap comprises at least one coupler for receiving a portion of the OTDR probe signal as well as the returned OTDR signal.

20. In the bi-directional optical transmission system of claim 19 wherein the at least one detector is arranged to also convert the OTDR probe signal to an electrical probe signal and a returned electrical signal.

21. In the bi-directional optical transmission system of claim 20 wherein said at least one coupler for receiving a portion of the OTDR probe signal and the returned OTDR signal is a bi-directional optical tap.

22. In the hi-directional optical transmission system of claim 21 wherein said at least one detector comprises first and second detectors for providing said electrical probe signal and said returned electrical signal, respectively.

23. In the bi-directional optical transmission system of claim 22 wherein said OTDR data acquisition arrangement further comprises a gate coupled to the first detector to activate the A/D converter upon receipt of the electrical probe signal.

* * * * *